United States Patent
Yamamoto et al.

(10) Patent No.: US 9,018,900 B2
(45) Date of Patent: Apr. 28, 2015

(54) BATTERY PACK, BATTERY POWERED DEVICE, AND CONTACTLESS CHARGING METHOD

(75) Inventors: Hiroyoshi Yamamoto, Sumoto (JP); Shinichi Itagaki, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 380 days.

(21) Appl. No.: 13/560,000

(22) Filed: Jul. 27, 2012

(65) Prior Publication Data
US 2013/0026984 A1    Jan. 31, 2013

(30) Foreign Application Priority Data
Jul. 28, 2011    (JP) .................. 2011-166096

(51) Int. Cl.
*H02J 7/00*    (2006.01)
*H02J 7/02*    (2006.01)

(52) U.S. Cl.
CPC ..................... *H02J 7/025* (2013.01)

(58) Field of Classification Search
USPC ........................................... 320/108
See application file for complete search history.

(56) References Cited

U.S. PATENT DOCUMENTS

| | | | | |
|---|---|---|---|---|
| 2002/0011823 | A1* | 1/2002 | Lee ............................. | 320/137 |
| 2007/0013342 | A1* | 1/2007 | Suzuki et al. ................ | 320/112 |
| 2008/0061733 | A1* | 3/2008 | Toya ............................ | 320/103 |
| 2008/0111518 | A1  | 5/2008 | Toya | |
| 2010/0039066 | A1* | 2/2010 | Yuan et al. ................... | 320/108 |
| 2011/0156636 | A1* | 6/2011 | Kim ............................. | 320/108 |

FOREIGN PATENT DOCUMENTS

| | | |
|---|---|---|
| JP | 2007-110820 | 4/2007 |
| JP | 2007-336710 | 12/2007 |
| JP | 2008-141940 | 6/2008 |

* cited by examiner

*Primary Examiner* — Paul Dinh
*Assistant Examiner* — Bryce Aisaka
(74) *Attorney, Agent, or Firm* — Wenderoth, Lind & Ponack, L.L.P.

(57) ABSTRACT

A battery pack having a contactless charging circuit (95) that rectifies power received by a receiving coil (1), and a battery pack control section (91) with a connection decision section. The battery pack control section (91) is configured to judge whether or not the battery pack is connected to the body of a battery powered device (101) based on the rectified voltage of the contactless charging circuit (95). This decision utilizes the fact that the charging circuit is in a no-load condition and the rectified voltage is high when the battery pack is not connected to the battery powered device, and allows reliable judgment of whether or not the battery pack (90) is attached to the battery powered device.

17 Claims, 9 Drawing Sheets

BATTERY PACK, BATTERY POWERED DEVICE, AND CONTACTLESS CHARGING METHOD

BACKGROUND OF THE INVENTION

1. Field of the Invention

The present invention relates to a battery pack, battery powered device, and contactless charging method that magnetically couples a receiving coil in a battery pack placed on a charging pad with a transmitting coil in the charging pad to transmit power by magnetic induction and charge the battery housed in the battery pack.

2. Description of the Related Art

Portable battery powered devices such as mobile phones and portable audio devices that can be carried conveniently are most often powered by batteries that can be recharged. These types of battery powered devices house an individual battery or batteries, or a battery pack. A battery powered device is charged with the battery or batteries inside by physical connection to a battery charger. Meanwhile, a charging pad has been developed to charge the battery or batteries without connecting electrical contacts, but rather by transmitting power via magnetic induction from a transmitting coil housed in the charging pad to a receiving coil.

Refer to Japanese Laid-Open Patent Publication 2008-141940.

The charging pad 910 and battery powered device 920 cited in JP 2008-141940 and shown in FIG. 12 are provided with a transmitting coil 911 driven by an alternating current (AC) power source housed in the charging pad 910, and a receiving coil 921 in the battery pack 930 that magnetically couples with the transmitting coil 911. A rechargeable battery cell 931 in the battery pack 930 is charged by power induced in the receiving coil 921. The battery pack 930 contains charging circuitry that rectifies AC power induced in the receiving coil 921 and supplies it to the rechargeable battery cell 931 for charging. With this system, a battery pack 930 can be placed on the charging pad 910 and the rechargeable battery cell 931 can be charged in a wireless manner without connecting electrical contacts (contactless charging).

To determine charge conditions during contactless charging of the rechargeable battery cell housed in a battery powered device, techniques have been implemented such as monitoring rechargeable battery cell voltage and/or charging current. However, accurate determination of the remaining charge capacity of the rechargeable battery cell has been problematic. Further, from the perspective of the battery pack, it is not trivial to determine whether the battery pack is (the bare unit) alone or is connected with the battery powered device.

In a system that charges through a current detection resistor connected to measure remaining capacity, a scheme can be conceived to determine whether the battery pack is alone or connected with a battery powered device by whether or not current flow is detected in the current detection resistor. However, this type of current flow judgment is subject to the effects of offset voltage in the amplifier used to amplify current detection resistor voltage. In particular, when battery cell voltage is high, judgment becomes difficult because the charging current is low. In constant current-constant voltage charging systems as well, current flow judgment is difficult when current flow becomes low during constant voltage charging.

The present invention was developed with the object of resolving the prior art issues described above. Thus, it is a primary object of the present invention to provide a battery pack, battery powered device, and contactless charging method that can accurately determine during battery pack charging whether the battery pack is attached to a battery powered device or is the bare battery pack alone, and can accurately compute remaining battery capacity.

SUMMARY OF THE INVENTION

To achieve the object described above, the battery pack for the first aspect of the present invention connects with the body of a battery powered device 101, which is capable of displaying remaining battery capacity, to supply power to drive the battery powered device. The battery pack 90 is provided with a rechargeable battery cell 2, a receiving coil 1 that can magnetically couple with a transmitting coil 113 housed in a charging pad 110, a charging current path formed by a charging circuit that converts power received by the receiving coil 1 from the transmitting coil 113 to charge the rechargeable battery cell 2, a connection decision section to determine whether the battery pack 90 is alone or connected with the body of the battery powered device 101, and a current path switch 93 connected with the charging circuit and controlled based on decisions by the connection decision section to close when the battery pack 90 is alone and to open when the battery pack 90 is connected with the body of the battery powered device 101. As a result, the battery pack can change the charging current path for electromotive force (EMF) induced in the receiving coil based on connection decision section determination of whether the battery pack is alone or connected with the body of a battery powered device. This allows accurate display of the remaining battery capacity by an indicator that implements the remaining capacity display capability of the battery powered device. Here, the body of the battery powered device designates the battery powered device without the battery pack attached.

The battery pack for the second aspect of the present invention can be configured to change the charging current path to allow transmission of information related to the remaining charge capacity of the rechargeable battery cell 2 to the body of the battery powered device 101. This makes it possible for the battery pack to transmit remaining rechargeable battery cell capacity to the battery powered device.

The battery pack for the third aspect of the present invention can further comprise a contactless charging circuit 95 that rectifies power induced in the receiving coil 1, and a battery pack control section 91 that includes the connection decision section. The battery pack control section 91 can be configured to judge whether or not the body of the battery powered device 101 is connected based on the voltage rectified by the contactless charging circuit 95. This enables reliable judgment of whether or not the battery powered device is connected by utilizing the fact that the charging circuit is in a no-load condition when the battery pack is not connected to the battery powered device and the rectified voltage is high.

In the battery pack for the fourth aspect of the present invention, the battery pack control section 91 can be configured to control the current path switch 93 open and closed. This enables the battery pack control section to reliably change the charging current path by issuing a control signal to open or close the current path switch depending on whether the battery pack is alone or connected to the battery powered device.

In the battery pack for the fifth aspect of the present invention, the connection decision section can be configured to compare the voltage rectified by the contactless charging circuit 95 with a set threshold voltage, the battery pack 90 can be judged as connected with the body of the battery powered device 101 when the rectified voltage is below the threshold voltage, and the battery pack 90 can be judged as unconnected when the rectified voltage is greater than the threshold voltage. This avoids judgment errors occurring in prior art charging current detection systems such as those caused by amplifier offset and those caused by low current during the constant voltage phase of constant current-constant voltage charging. Since judgment is based on the voltage after rectification, the effect of errors can be reduced.

In the battery pack for the sixth aspect of the present invention, the threshold voltage can be set higher than the full-charge voltage of the rechargeable battery cell 2. The voltage after rectification becomes the rechargeable battery cell voltage, and since that voltage will not exceed the threshold voltage when the battery pack and battery powered device are connected, judgment errors can be avoided.

In the battery pack for the seventh aspect of the present invention, the initial state of the current path switch 93 is set to the open condition. This can prevent self-discharge of the internal rechargeable battery cell when the battery pack is not connected.

The battery pack for the eighth aspect of the present invention is further provided with an adapter decision section to determine whether or not the battery pack 90 is connected to the body of a battery powered device 101 receiving power from an alternating current to direct current (AC/DC) adapter 143 connected to an external source of commercial power. This allows contactless charging to be suspended to give stable wire-connected charging priority when an AC/DC adapter is connected.

The battery pack for the ninth aspect of the present invention is provided with a data terminal 103 that connects to the DC supply voltage of the AC/DC adapter 143 or to a voltage converted from that supply voltage, and the battery pack control section 91 acting as the adapter decision section uses the data terminal 103 to determine whether or not the AC/DC adapter 143 is connected. Accordingly, when the voltage at the data terminal is greater than or equal to a prescribed voltage, AC/DC adapter connection is deduced, and contactless charging can be suspended.

The battery powered device for the tenth aspect of the present invention is provided with a battery pack 90, and a body of the battery powered device 101 that is driven by power supplied from the connected battery pack 90 and is capable of displaying the remaining capacity of the battery pack 90. The battery pack 90 is provided with a rechargeable battery cell 2, a receiving coil 1 that can magnetically couple with a transmitting coil 113 housed in a charging pad 110, a charging current path formed by a charging circuit that converts power received by the receiving coil 1 from the transmitting coil 113 to charge the rechargeable battery cell 2, a connection decision section to determine whether the battery pack 90 is alone or connected with the body of the battery powered device 101, and a current path switch 93 connected with the charging circuit and controlled based on decisions by the connection decision section to close when the battery pack 90 is alone and to open when the battery pack 90 is connected with the body of the battery powered device 101. This enables reliable judgment of whether the battery pack is alone or connected with the body of the battery powered device by utilizing the fact that the charging circuit is in a no-load condition and the rectified voltage is high when the battery pack is not connected to the battery powered device. There are also no amplifier offset voltage effects such as in prior art charging current detection systems, and since decision is based on the voltage after rectification, the effect of errors can be reduced.

The battery powered device for the eleventh aspect of the present invention can be configured to communicate data related to rechargeable battery cell 2 remaining capacity with the body of the battery powered device 101 by changing the charging current path. This allows communication of the remaining battery capacity of the rechargeable battery cell in the battery pack with the battery powered device.

In the battery powered device for the twelfth aspect of the present invention, the body of the battery powered device 101 is provided with a remaining capacity computation section connected with the charging circuit that can compute rechargeable battery cell 2 remaining capacity during rechargeable battery cell 2 charging by integrating current or power due to current flowing through the charging current path that forms the charging circuit. This enables the battery powered device to integrate rechargeable battery cell charging current or power and acquire the rechargeable battery cell remaining capacity.

In the battery powered device for the thirteenth aspect of the present invention, the remaining capacity computation section is provided with a charging current detection resistor 156 to detect the current that charges the rechargeable battery cell 2. As a result, the remaining capacity computation section can accurately display remaining battery capacity with the indicator in the battery powered device using the flow of charging current through the charging current detection resistor.

The battery pack contactless charging method for the fourteenth aspect of the present invention is a method that places the battery pack 90 on a charging pad 110, magnetically couples a receiving coil 1 housed in the battery pack 90 with a transmitting coil 113 in the charging pad 110, and transmits power from the charging pad 110 to the battery pack 90 to charge the rechargeable battery cell 2 inside the battery pack 90. The method includes a step to place the battery pack 90 on the charging pad 110, activate a battery pack control section 91, and open a current path switch 93; and a step to determine if the battery pack 90 is alone or attached to the body of a battery powered device 101 using the battery pack control section 91, and open the current path switch 93 to change the charging current path with the battery pack control section 91 when the battery pack 90 is determined to be attached to the body of the battery powered device 101. This enables reliable judgment of whether the battery pack is alone or connected with the body of the battery powered device utilizing the fact that the charging circuit is in a no-load condition and rectified voltage is high when the battery pack is used without connection to the battery powered device. Further, since judgments are based on voltage rather than on charging current used in prior art systems, the effect of errors can be reduced.

In the battery pack contactless charging method for the fifteenth aspect of the present invention, the system can be configured to communicate data related to rechargeable battery cell 2 remaining capacity with the body of the battery powered device 101 by changing the charging current path.

The battery pack contactless charging method for the sixteenth aspect of the present invention further includes a step to determine whether or not the battery pack 90 is connected to the body of a battery powered device 101 receiving power from an AC/DC adapter 143 connected to an external commercial power source, to begin contactless charging when the AC/DC adapter 143 is judged as not connected, and to suspend contactless charging when the AC/DC adapter 143 is judged as connected. This allows contactless charging to be suspended to give stable, low-energy-loss wire-connected charging priority when an AC/DC adapter is connected. The above and further objects of the present invention as well as the features thereof will become more apparent from the following detailed description to be made in conjunction with the accompanying drawings.

DETAILED DESCRIPTION OF THE EMBODIMENTS

The following describes embodiments of the present invention based on the figures. However, the following embodiments are merely specific examples of a battery pack, battery powered device, and contactless charging method representative of the technology associated with the present invention, and the battery pack, battery powered device, and contactless charging method of the present invention are not limited to the embodiments described below. Further, components cited in the claims are in no way limited to the components indicated in the embodiments. In particular, in the absence of specific annotation, structural component features described in the embodiment such as dimensions, raw material, shape, and relative position are simply for the purpose of explicative example and are in no way intended to limit the scope of the invention. Properties such as the size and spatial relation of components shown in the figures may be exaggerated for the purpose of clear explanation. In the descriptions following, components with the same name and label indicate components that are the same or have the same properties and their detailed description is appropriately abbreviated. Further, a single component can serve multiple functions and a plurality of structural elements of the invention can be implemented with the same component. In contrast, the functions of a single component can be divided among a plurality of components. In addition, explanations used to describe part of one embodiment may be used in other embodiments and descriptions.

Figure 1:
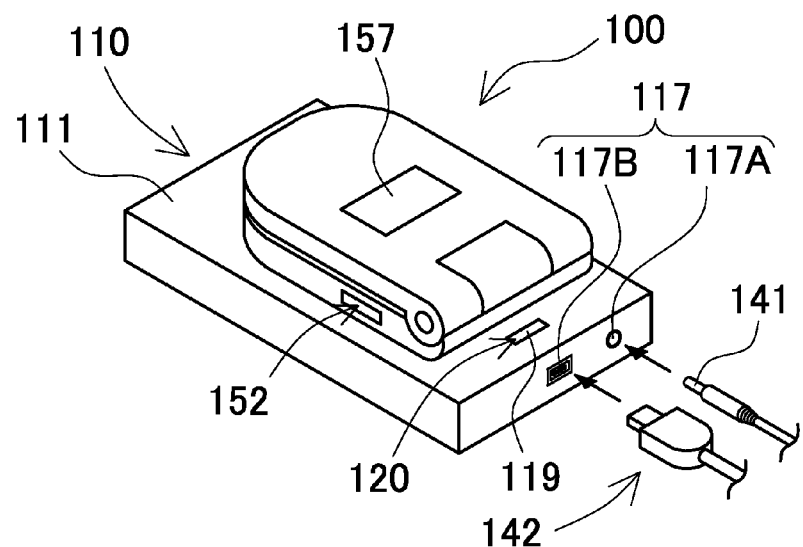
FIG. 1 is an oblique view showing a battery powered device housing a battery pack placed on a contactless battery charger (charging pad)
Figure 2:
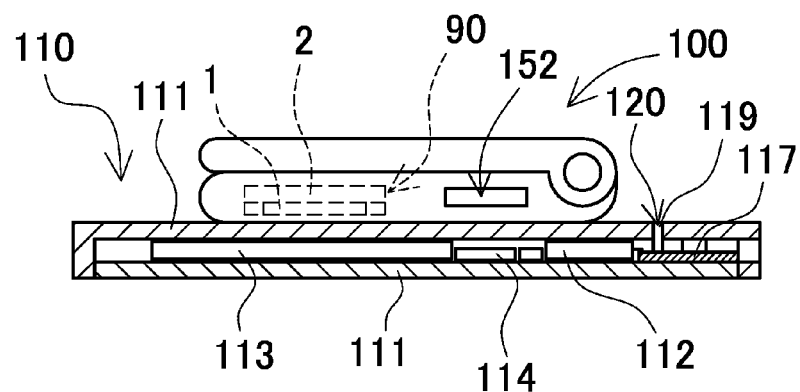
FIG. 2 is a vertical cross-section showing charging of the battery powered device placed on the battery charger (charging pad) shown in FIG. 1.
Figure 3:
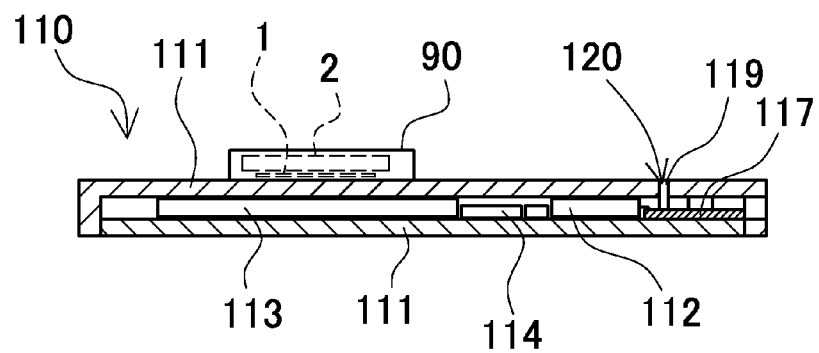
FIG. 3 is a vertical cross-section showing charging of a battery pack placed on the battery charger (charging pad) shown in FIG. 2.

The following describes implementations of a battery pack for contactless charging as embodiments based on FIGS. 1-3. FIG. 1 is an oblique view showing a battery powered device housing a battery pack placed on a contactless battery charger (charging pad), FIG. 2 is a vertical cross-section showing charging of the battery powered device placed on the battery charger (charging pad), and FIG. 3 is a vertical cross-section showing charging of a battery pack placed on the battery charger (charging pad).

The charging pad 110 shown in FIGS. 1-3 is provided with a transmitting coil 113 that magnetically couples with a receiving coil 1 in the battery pack 90, and a high frequency power source control circuit 114 that supplies high frequency power to the transmitting coil 113. DC power is supplied to the high frequency power source control circuit 114 either from a DC connecting plug 141 connected to a charging pad AC/DC converter (not illustrated), from a universal serial bus (USB) cable 142, or from a charging pad rechargeable battery 112. The external case 111 of the contactless charging pad 110 is provided with DC input terminals 117 made up of a DC connecting terminal 117A to connect the DC connecting plug 141 from the charging pad AC/DC converter and a USB terminal 117B to connect a USB cable 142. DC power from the DC input terminals 117 charges the charging pad rechargeable battery 112 or directly powers the high frequency power source control circuit 114. When no power is supplied to the DC input terminals 117, DC power can be supplied to the high frequency power source control circuit 114 from the charging pad rechargeable battery 112. This allows the high frequency power source control circuit 114 to generate high frequency power with DC power supplied from the charging pad rechargeable battery 112 even when no power is supplied to the DC input terminals 117, and makes the charging pad 110 portable.

Figure 4:
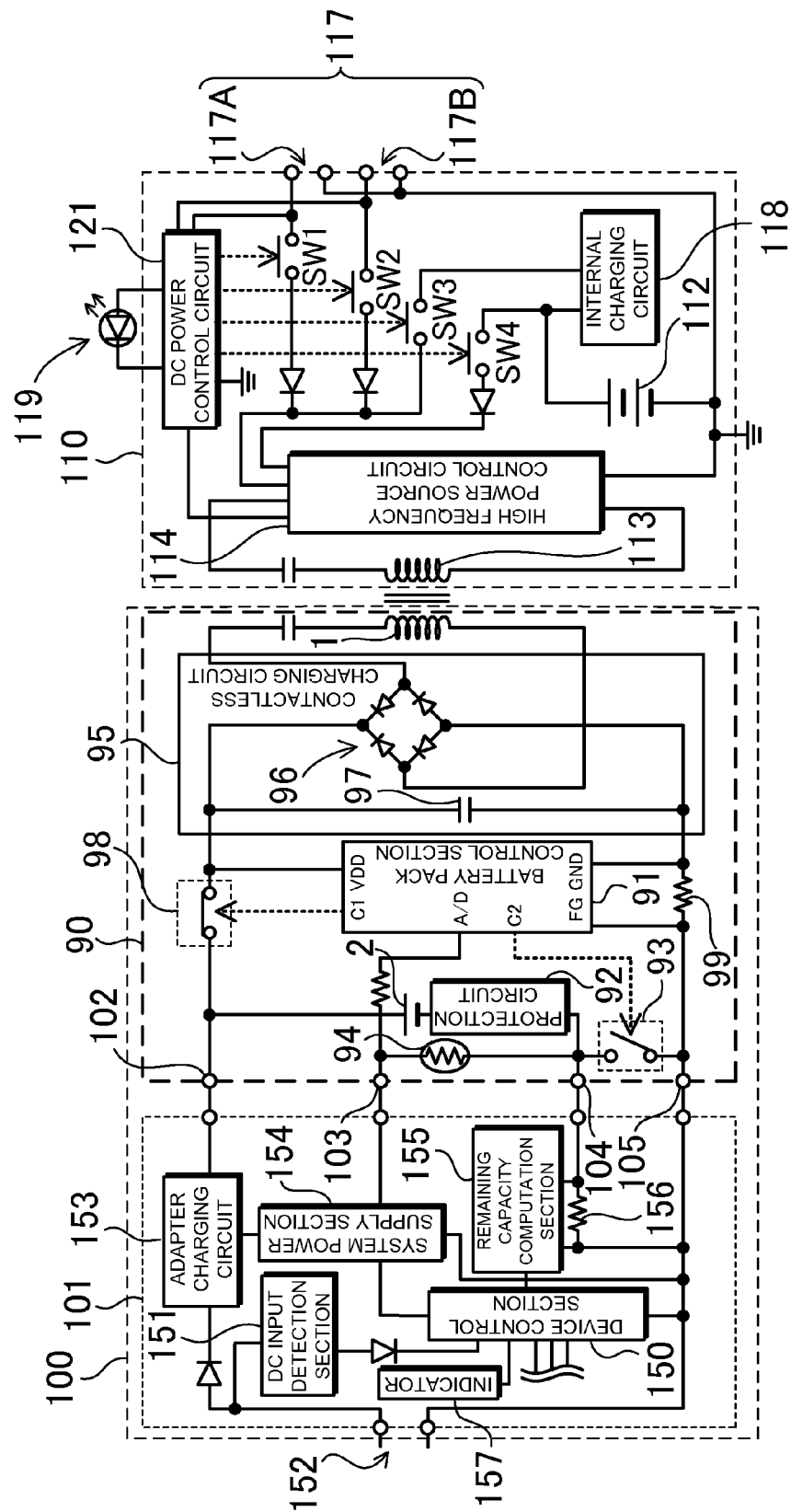
FIG. 4 is a block diagram of the circuitry incorporated in FIGS. 1 and 2.

Turning to the battery powered device 100 shown in FIG. 1, the battery powered device 100 has an indicator 157 capable of displaying the remaining capacity of the rechargeable battery cell 2. As shown in FIG. 4, rechargeable battery cell 2 remaining capacity displayed in the indicator 157 is computed from the voltage detected across a charging current detection resistor 156 inside the battery powered device 100. The voltage detected across the charging current detection resistor 156 is used as a current value by a remaining capacity computation section 155 (fuel gage integrated circuit [FG-IC]) to compute (integrate) remaining capacity. Or, the current value is multiplied by the voltage applied to the body of the battery powered device 101 to compute (integrate) power, which can be displayed in the indicator 157.

Further, the charging pad 110 in FIG. 1 is provided with an indicator section that displays rechargeable battery cell 2 remaining capacity. The charging pad 110 indicator section, which displays rechargeable battery cell 2 remaining capacity, is a charging indicator light emitting diode (LED) 119. As shown in FIG. 4, the charging indicator LED 119 is connected to a DC power control circuit 121. Current flow through the charging indicator LED 119 is controlled by the DC power control circuit 121 to indicate the rechargeable battery cell 2 charging state by LED light emissions. The charging indicator LED 119 shown in FIGS. 1 and 2 is mounted on a circuit board and held in a fixed position inside the charging pad 110 external case 111. The external case 111 has an LED opening 120 positioned at the charging indicator LED 119 location, and the charging indicator LED 119 is exposed outside the external case 111 through the LED opening 120. The DC power control circuit 121 controls the charging indicator LED 119 ON and OFF according to the rechargeable battery cell 2 remaining capacity detected by the high frequency power source control circuit 114 to indicate rechargeable battery cell 2 remaining capacity by the ON and OFF pattern of the charging indicator LED 119.

The battery powered device 100 also has a DC input connector 152 that serves as the input terminal for an AC/DC adapter connected to an AC power source. This allows DC power to be supplied from the DC input connector 152 to a battery pack 90 connected with the battery powered device 100, and allows the rechargeable battery cell 2 inside the battery pack 90 to be rapidly and stably charged with a high charging current.

FIG. 3 shows a vertical cross-section of a battery pack 90 placed on the charging pad 110 without being attached to a battery powered device 100. In this configuration, the receiving coil 1 in the battery pack 90 is magnetically coupled with the transmitting coil 113 in the charging pad 110, and induced EMF can be generated by the received magnetic flux.

As shown in FIG. 4, induced EMF generated via the receiving coil 1 is converted to DC power to charge the rechargeable battery cell 2 by a contactless charging circuit 95. Although not illustrated, the rechargeable battery cell 2 in this embodiment has monitoring circuitry that measures parameters such as charging voltage, charging current, and battery temperature. If any one of the monitored rechargeable battery cell parameters exceeds a preset threshold value, the receiving coil 1 is modulated with an added signal that can be received on the transmitting coil 113 side by the high frequency power source control circuit 114 for output adjustment. For example, when the rechargeable battery cell 2 in the battery pack 90 reaches full-charge, the charging pad 110 can receive a signal from the battery pack 90 and the high frequency power source control circuit 114 can suspend its output. This can assure battery pack 90 safety and can also have the effect of reducing energy consumption by stopping output from the charging pad 110.

(Rechargeable Battery Cell 2)

The rechargeable battery cell 2 housed in the battery pack 90 can have a rectangular external metal case that is thinner than it is wide and formed in single-piece construction. For example, the metal case can be formed from aluminum to protect the battery cell from external mechanical shock and also realize superior heat radiating properties.

By using a high energy density lithium ion or lithium polymer battery as the rechargeable battery cell for this embodiment, the battery cell has overall light-weight, thin, and compact properties that allow it to be conveniently used in portable devices. However, the rechargeable battery cell is not limited to lithium ion or lithium polymer and can be any chargeable battery such as nickel hydride or nickel cadmium.

Figure 5:
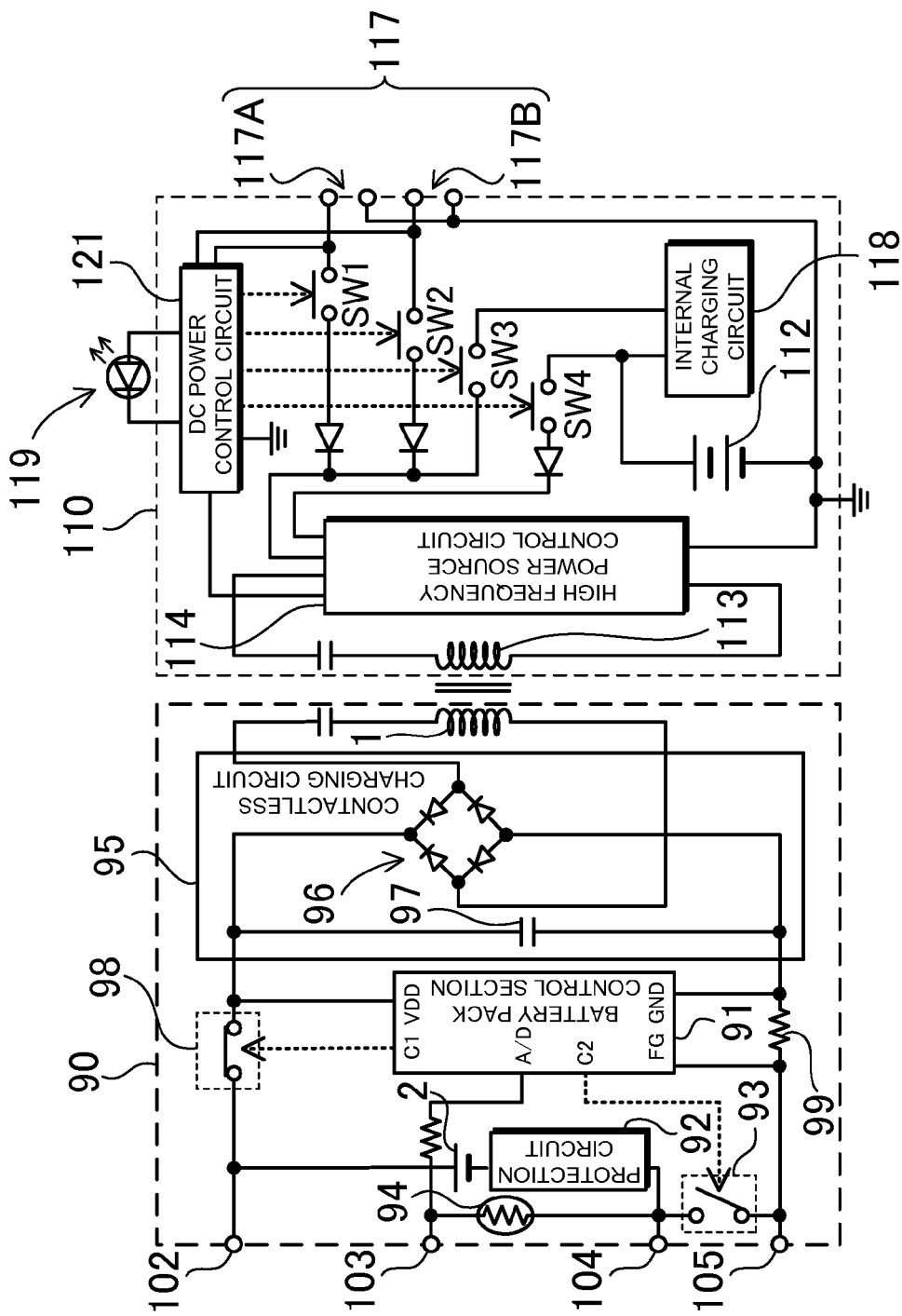
FIG. 5 is a block diagram of the circuitry incorporated in FIG. 3.
Figure 6:
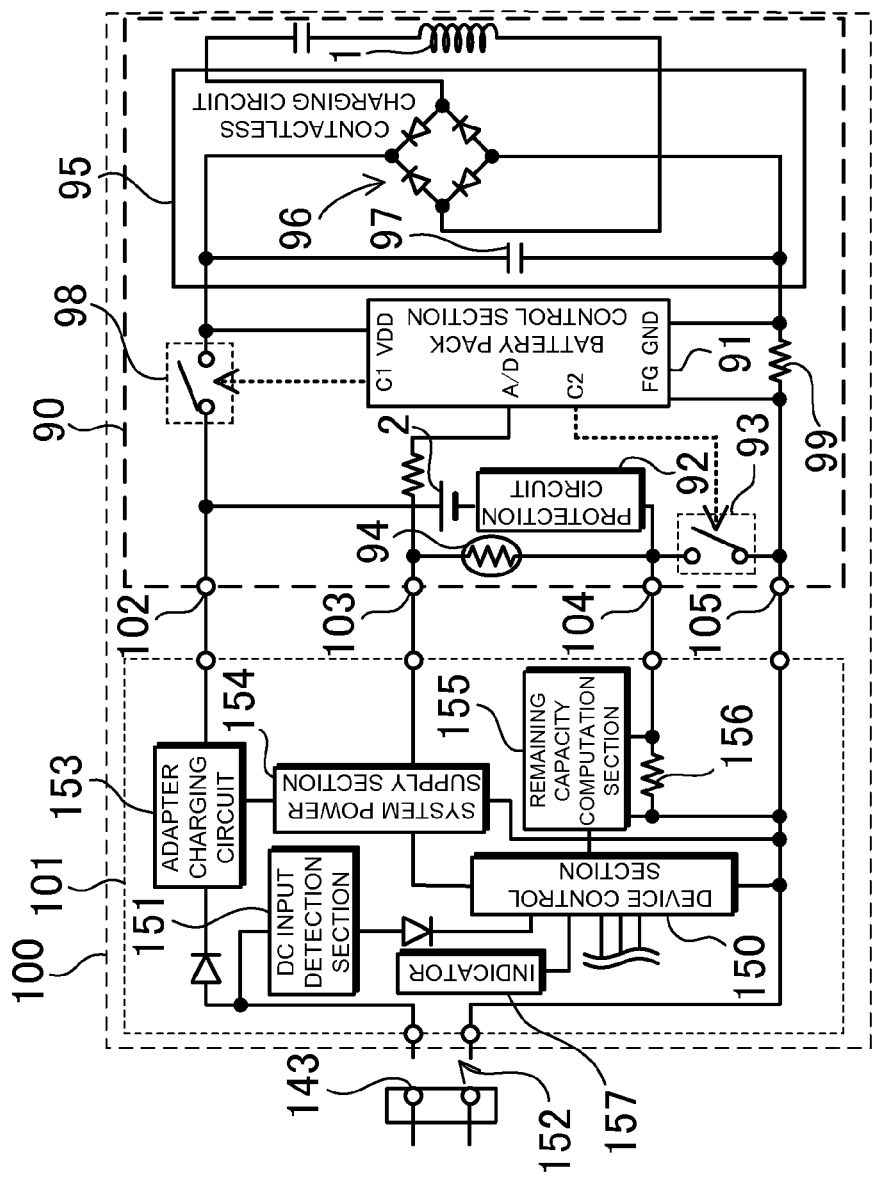
FIG. 6 is a block diagram of the circuitry for an AC/DC adapter connected to the battery powered device.

FIGS. 4-6 show block diagrams of circuitry for contactless charging of the rechargeable battery cell 2. First, FIG. 4 shows a block diagram of circuitry to charge the rechargeable battery cell 2 of a battery pack 90 housed in a battery powered device 100 placed on the charging pad 110. FIG. 5 shows a block diagram of circuitry to charge the rechargeable battery cell 2 of a battery pack 90 placed on the charging pad 110 as a bare unit. Finally, FIG. 6 shows a block diagram of circuitry for wire-connected charging of the rechargeable battery cell 2 in a battery pack 90 attached to a battery powered device 100 that is supplied with DC power through the battery powered device 100 DC input connector 152.

(Charging Pad 110)

The battery powered device 100 placed on the charging pad 110 shown in FIG. 4 receives power supplied from the battery pack 90 housed inside. The charging pad 110 for contactless charging of the battery pack 90 applies high frequency power from the high frequency power source control circuit 114 to the transmitting coil 113 to emit magnetic flux and generate induced EMF in the receiving coil 1 inside the battery pack 90. Here, the high frequency power source control circuit 114 in the charging pad 110 can be supplied with DC power from DC input terminals 117 that are a DC connecting terminal 117A that receives power from the charging pad AC/DC converter and a USB terminal 117B. The DC power can be supplied to charge the charging pad rechargeable battery 112 as well as power the high frequency power source control circuit 114 to convert DC power to high frequency power supplied to the transmitting coil 113. Further, when no DC power is supplied to the DC input terminals 117, DC power can be supplied to the high frequency power source control circuit 114 from the charging pad rechargeable battery 112. The transmitting coil 113, which implements contactless charging, can couple its magnetic flux with the receiving coil 1 on the battery powered device-side to generate induced EMF in the receiving coil 1.

Supply of power to the high frequency power source control circuit 114 is controlled by a DC power control circuit 121 that controls switches SW1, SW2, SW3, SW4 ON and OFF to switch power from the DC input terminals 117 and to and from the charging pad rechargeable battery 112. For charging pad rechargeable battery 112 charging, the DC power control circuit 121 recognizes the input of DC power to the DC input terminals 117 and switches SW1 or SW2 ON and SW3 ON to complete the charging circuit. Here, an internal charging circuit 118 activated by DC current flow determines whether or not the charging pad rechargeable battery 112 is fully-charged. If the charging pad rechargeable battery 112 can be charged, charging is started, and if it is fully-charged, no power is supplied. As a result, the charging pad 110 can be carried in portable manner, and it is possible to supply power to the high frequency power source control circuit 114 from the charging pad rechargeable battery 112 for contactless charging of the battery pack 90 even at a location with no AC or USB power source.

The high frequency power source control circuit 114 determines whether or not the transmitting coil 113 and receiving coil 1 are within a range where their magnetic coupling can be recognized. If the coils are within range for power transmission and reception, the high frequency power source control circuit 114 supplies power, and if they are outside the range for reception, the supply of power is stopped. As a result, the charging pad 110 does not transmit wasted power and only transmits power when necessary to achieve energy efficiency.

The DC power control circuit 121 also receives signals carrying data such as rechargeable battery cell 2 remaining capacity, charging voltage, full-charge information, and abnormal output termination signals by detecting changes in the high frequency voltage, current, phase, and/or modulated frequency of the high frequency power source control circuit 114. The DC power control circuit 121 has a charging indicator LED 119 connected to display rechargeable battery cell 2 remaining capacity by the ON and OFF pattern of the LED. This enables the charging pad 110 to stop supplying high frequency power based on the full-charge information, and operate only when required to realize energy efficiency.

(Battery Pack 90)

The battery powered device 100 is configured as a body of the battery powered device 101 that is supplied with power from the battery pack 90. Accordingly, the battery pack 90 has a total of four terminals that are a positive terminal 102, a negative terminal 104, a data terminal 103, and a fuel gage (FG) terminal 105. When the body of the battery powered device 101 and battery pack 90 are connected by the four terminals, battery powered device 100 information and battery pack 90 rechargeable battery cell 2 information can be exchanged. Here, the body of the battery powered device 101 acquires temperature data via the data terminal 103 based on voltage information from the temperature detection section 94.

The battery pack 90 is also provided with an adapter decision section to determine whether or not the battery pack 90 is connected to a battery powered device 100 receiving power from an AC/DC adapter 143 connected to an external commercial power source. For example, in the circuit example of FIG. 6, the adapter decision section can be implemented by the battery pack control section 91. The battery pack control section 91 can determine the connection status of the battery powered device based on voltage from the AC/DC adapter 143. In the circuit example of FIG. 6, the DC power supply voltage of the AC/DC adapter 143 or a voltage converted from the power supply voltage is applied to the battery pack 90 data terminal 103 and transmitted to the battery pack control section 91. The battery pack control section 91 can judge that the AC/DC adapter 143 is connected when the voltage at the data terminal 103 is greater than or equal to a prescribed voltage. This enables the battery pack 90 to decide whether to charge the rechargeable battery cell 2 from the body of the battery powered device 101 or by induced EMF from the contactless charging pad 110 based on the connection status of the body of the battery powered device 101. The rechargeable battery cell 2 has a series-connected protection circuit 92 to protect it from over-current during contactless charging or wire-connected charging from the body of the battery powered device 101. This improves the margin of safety. Note that this structure represents one example, and it should be clear that the adapter decision section could also be established as a separate unit from the battery pack control section.

When the AC/DC adapter 143 is connected, a system power supply section 154 applies a voltage to the temperature detection section 94, and the battery pack control section 91 detects when the voltage at the upper end of the temperature detection section 94 becomes greater than the prescribed voltage. When that voltage is less than the prescribed voltage, the battery pack control section 91 judges that the AC/DC adapter 143 is not connected.

High frequency power, which is EMF induced in the battery pack 90 receiving coil 1 due to magnetic flux from the transmitting coil 113, is converted to DC power in the contactless charging circuit 95 and that DC can flow through a charging switch 98 to charge the rechargeable battery cell 2. The contactless charging circuit 95 first rectifies the high frequency power in a rectifying circuit 96, then removes ripple current with a smoothing capacitor 97 to produce DC power for charging the rechargeable battery cell 2.

The battery pack 90 in this embodiment has a charging switch 98 that is open when the battery pack 90 is placed on the charging pad 110 and closes when the battery pack control section 91 is activated, and a current path switch 93 that defaults to the open state when the battery pack control section 91 is not activated. The charging switch 98 and the current path switch 93 are both controlled by the battery pack control section 91. The charging switch 98 controls power output from the contactless charging circuit 95 to control the supply of charging power to the rechargeable battery cell 2. The current path switch 98 is controlled open or closed according the whether or not the battery powered device 100 is connected.

By implementing the charging switch 98 and the current path switch 93 by semiconductor current control devices such as field effect transistors (FETs) or bipolar transistors, the circuitry can be miniaturized. Preferably, by selecting semiconductor FETs with low ON-state power loss as the switches, losses during conversion of the received power can be reduced.

In the battery pack 90 in FIG. 4, the battery pack control section 91 that controls contactless power output from the contactless charging circuit 95 executes a command to close the charging switch 98 and begin charging. Conditions to issue the command to close the charging switch 98 and begin charging are temperature detected by a thermistor (not illustrated) internal to the battery pack control section 91 within a prescribed range, and no DC power supplied from the battery powered device 100. Data representing these conditions are transmitted to the battery pack control section 91 to control the charging switch 98. This allows the rechargeable battery cell 2 to be protected from conditions such as excessive temperature rise during battery pack 90 charging.

(Connection Decision Section)

The battery pack 90 determines whether the battery powered device 100 is connected or the battery pack 90 is unconnected with the connection decision section. For example, the connection decision section is implemented by the battery pack control section 91. In the example of FIG. 4, the integrated circuit that makes up the battery pack control section 91 includes the functions of the connection decision section. However, the connection decision section could also be established as a separate unit from the battery pack control section.

Voltage between the Vdd and GND terminals of the battery pack control section 91 (contactless charging circuit 95 rectified voltage) is compared with a threshold voltage described below to determine whether the body of the battery powered device 101, which is the load device, is connected or not. In this embodiment, since the battery pack 90 no-load voltage is approximately 5V and rechargeable battery cell 2 voltage is approximately 4.2V or less when load device is connected, an intermediate voltage of approximately 4.6V is adopted as the threshold voltage. By making the threshold voltage greater than the rechargeable battery cell full-charge voltage, connection decision errors can be prevented even when the battery powered device 100 is connected. However, the threshold voltage can be changed according to the type of rechargeable battery cell used in the battery pack.

In FIG. 4 and as described later, the battery pack control section 91 detects data terminal 103 temperature detection section 94 voltage, and determines that the AC/DC adapter 143 is not connected if the voltage is less than or equal to a prescribed voltage. In FIG. 4 with the body of the battery powered device 101 connected to the battery pack 90 and the current path switch 93 open, the rechargeable battery cell 2 charging circuit is completed by a charging current path through the negative terminal 104, the charging current detection resistor 156 in the body of the battery powered device 101, and the FG terminal 105. Under these conditions, the voltage between the Vdd and GND terminals of the battery pack control section 91 becomes approximately equal to the rechargeable battery cell 2 voltage, which is below the threshold voltage. Based on this information, the battery pack control section 91 can issue a command to maintain the current path switch 93 in the open state and begin contactless charging.

In addition, since the current path switch 93 defaults to the open state, no rechargeable battery cell 2 discharge path is established when the battery pack is stored as a bare unit (in the unconnected state), and battery pack 90 self discharge can be minimized.

(Battery Powered Device 100)

As one example of possible circuit structure, the battery powered device 100 for this embodiment has a DC input connector 152, a DC input detection section 151, an adapter charging circuit 153, a system power supply section 154, a remaining capacity computation section 155, a charging current detection resistor 156, an indicator 157, and a device control section 150. The battery powered device 100 is controlled by signals from the device control section 150. Accordingly, the device control section 150 is supplied with power from the rechargeable battery cell 2 in the connected battery pack 90, and controls charging and discharging of the battery pack 90.

The battery powered device 100 is provided with a remaining capacity computation section that can compute the remaining charge capacity of the rechargeable battery cell 2 in the connected battery pack 90 by integrating current flow in the rechargeable battery cell 2 charging path. For example, in the circuit example of FIG. 4, this is implemented by the remaining capacity computation section 155 (FG-IC) inside the battery powered device 100. Here, charging current flows through the charging current detection resistor 156, and that current is integrated by the remaining capacity computation section 155 enabling the battery powered device 100 to compute rechargeable battery cell 2 remaining capacity. The computed rechargeable battery cell 2 remaining capacity is sent to the device control section 150 and displayed by the indicator 157, which implements the battery powered device's capability to display remaining capacity, allowing the state of charging to be discerned. Note that this structure represents one example, and charging current could also be detected inside the battery pack in a hard-wired or contactless manner to compute remaining capacity, implement the remaining capacity computation section, and control charging current.

The battery pack 90 in FIG. 5 is placed on the charging pad 110 as a bare unit that is not connected with the body of a battery powered device 101. First, the battery pack control section 91 detects the temperature detection section 94 voltage at the data terminal 103, and determines that the AC/DC adapter 143 is not connected when the detected voltage is less than or equal to the prescribed voltage. The current path switch 93, which is defaulted to the open state, open circuits connection between the negative terminal 104 and the FG terminal 105. Consequently, voltage between the Vdd and GND terminals of the battery pack control section 91 is approximately 5V and greater than the threshold voltage. Based on that information, the battery pack control section 91 closes the current path switch 93 to allow contactless charging to begin. Current is detected by a contactless charging current detection resistor 99 to determine full-charge.

The battery pack 90 in FIG. 6 is connected with the body of a battery powered device 101, and the body of the battery powered device 101 is supplied with DC power through its DC input connector 152 from an AC/DC adapter 143 connected to a source of commercial power. The body of the battery powered device 101 detects DC power supplied to the DC input connector 152 with the DC input detection section 151 and the adapter charging circuit 153. When the adapter charging circuit 153 detects DC power input, it sends that information through the system power supply section 154 and the battery pack 90 data terminal 103 to the battery pack control section 91 allowing the charging switch 98 to be opened to disable contactless charging. In this manner, when an AC/DC adapter 143 is connected, voltage is applied to the temperature detection section 94 by the system power supply section 154, the voltage at the upper end of the temperature detection section 94 becomes greater than the prescribed voltage, and the battery pack control section 91 detects that condition. When the voltage at the data terminal 103 is less than the prescribed voltage, the battery pack control section 91 concludes that an AC/DC adapter 143 is not connected.

The adapter charging circuit 153 operates to supply DC power to the battery pack 90 rechargeable battery cell 2 through the positive terminal 102 and the system power supply section 154. The voltage across the charging current detection resistor 156 can be detected by the remaining capacity computation section 155 to detect charging current and the state of charging of the rechargeable battery cell 2 inside the battery pack 90. With this detection data, the device control section 150 can control battery pack 90 charging and display rechargeable battery cell 2 remaining capacity with the indicator 157. This allows the battery pack 90 rechargeable battery cell 2 to be charged by DC power from the DC input connector 152 in the body of the battery powered device 101.

If adapter charging is performed at the same time as contactless charging in the configuration shown in FIG. 4, the system power supply section 154 applies voltage to the temperature detection section 94 indicating AC/DC adapter 143 connection, and the battery pack control section 91 detects a voltage greater than the threshold voltage at the temperature detection section 94. The current path switch 93, which is open by default, maintains an open condition between the negative terminal 104 and the FG terminal 105. Consequently, the voltage between the Vdd and GND terminals of the battery pack control section 91 becomes approximately 5V and greater than the threshold voltage. The battery pack control section 91 detects that, sends a stop-charging signal to the charging pad 110, and opens the charging switch 98 to disable contactless charging of the battery pack 90.

Figure 7:
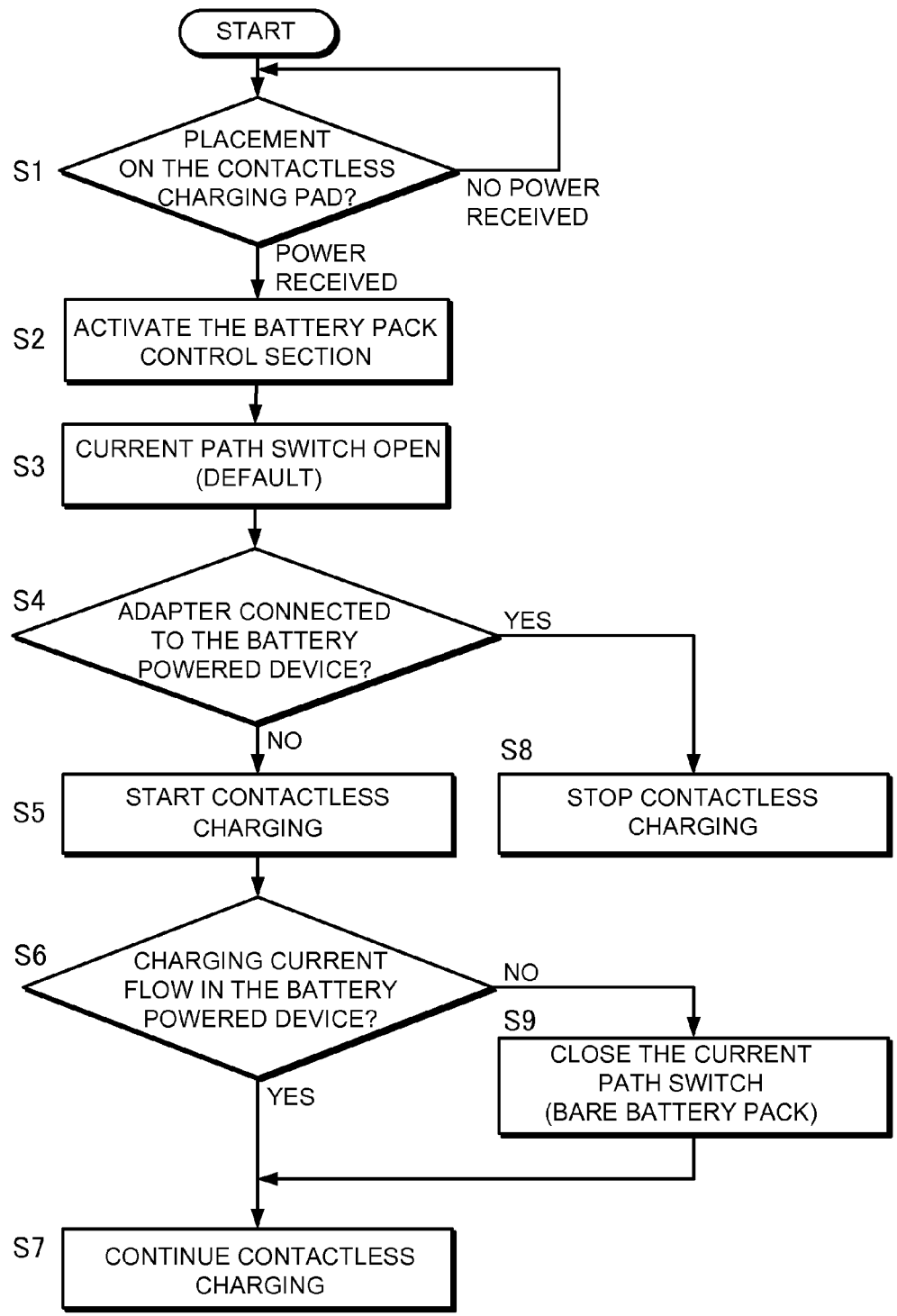
FIG. 7 is a flow-chart showing battery pack operations for contactless charging according to the first embodiment of the present invention.

Turning to FIG. 7, battery pack operations for contactless charging according to the first embodiment of the present invention are shown by a flow-chart.

[Step S1]

In step S1, it is judged whether or not the battery pack 90 is placed on the contactless charging pad 110. This decision is made by charging pad 110 recognition of the resonant frequency of the charging pad 110 transmitting coil 113 coupled with the battery pack 90 receiving coil 1. When the charging pad 110 recognized resonance with the transmitting coil 113, it begins power transmission. The charging pad 110 transmits no power if resonance is not determined. Accordingly, the battery pack 90 begins receiving power when the charging pad 110 begins transmitting power, and receives no power when none is transmitted.

[Step S2]

In step S2, the battery pack 90 receives magnetic flux from the charging pad 110, induced EMF is generated by the receiving coil 1, induced power is converted to DC power by the contactless charging circuit 95, and operation of the battery pack control section 91 is started.

[Step S3]

In step S3, the battery pack control section 91 receives contactless power and maintains the current path switch 93 in the open state. (The default condition of the current path switch 93 is open.)

[Step S4]

In step S4, it is judged whether or not DC power is supplied from an AC/DC adapter to the body of the battery powered device 101 connected with the battery pack 90. This is determined by the battery pack control section 91 depending on the HIGH or LOW state of the voltage at the data terminal 103, which is a battery pack 90 connecting terminal for connection with the body of the battery powered device 101. For example, if an AC/DC adapter is connected to the body of the battery powered device, voltage at the data terminal 103 becomes HIGH, the battery pack control section 91 determines that charging with the DC power is possible, and control moves to step S8. When no DC power is supplied to the body of the battery powered device 101, voltage at the data terminal 103 becomes LOW, the battery pack control section 91 determines that contactless charging is possible, and control sequences to step S5.

[Step S5]

In step S5, the battery pack control section 91 closes the charging switch 98 to begin contactless charging.

[Step S6]

In step S6, it is judged whether or not charging current flows in the body of the battery powered device. Instead of direct measurement of the charging current, the previously described Vdd to GND voltage is compared with the threshold voltage. If the Vdd to GND voltage is greater than the threshold voltage, it is judged that no charging current flows through the charging current detection resistor 156, that the battery pack is unconnected, and flow moves to step S9. If the Vdd to GND voltage is less than the threshold voltage, it is judged that charging current flows through the charging current detection resistor 156, that the battery pack 90 is connected with the body of the battery powered device 101, and control sequences to step S7. (In this case the current path switch 93 remains open.)

[Step S7]

In step S7, the battery pack control section 91 continues to supply power from the (contactless) charging pad 110 to charge the rechargeable battery cell 2.

[Step S8]

In step S8, the battery pack control section 91 opens the charging switch 98 to stop contactless charging, and issues a stop-charging signal to the charging pad 110.

[Step S9]

In step S9, the battery pack control section 91 closes the current path switch 93, continues to supply power from the charging pad 110 to charge the rechargeable battery cell 2, and flow moves to step S7.

Figure 8:
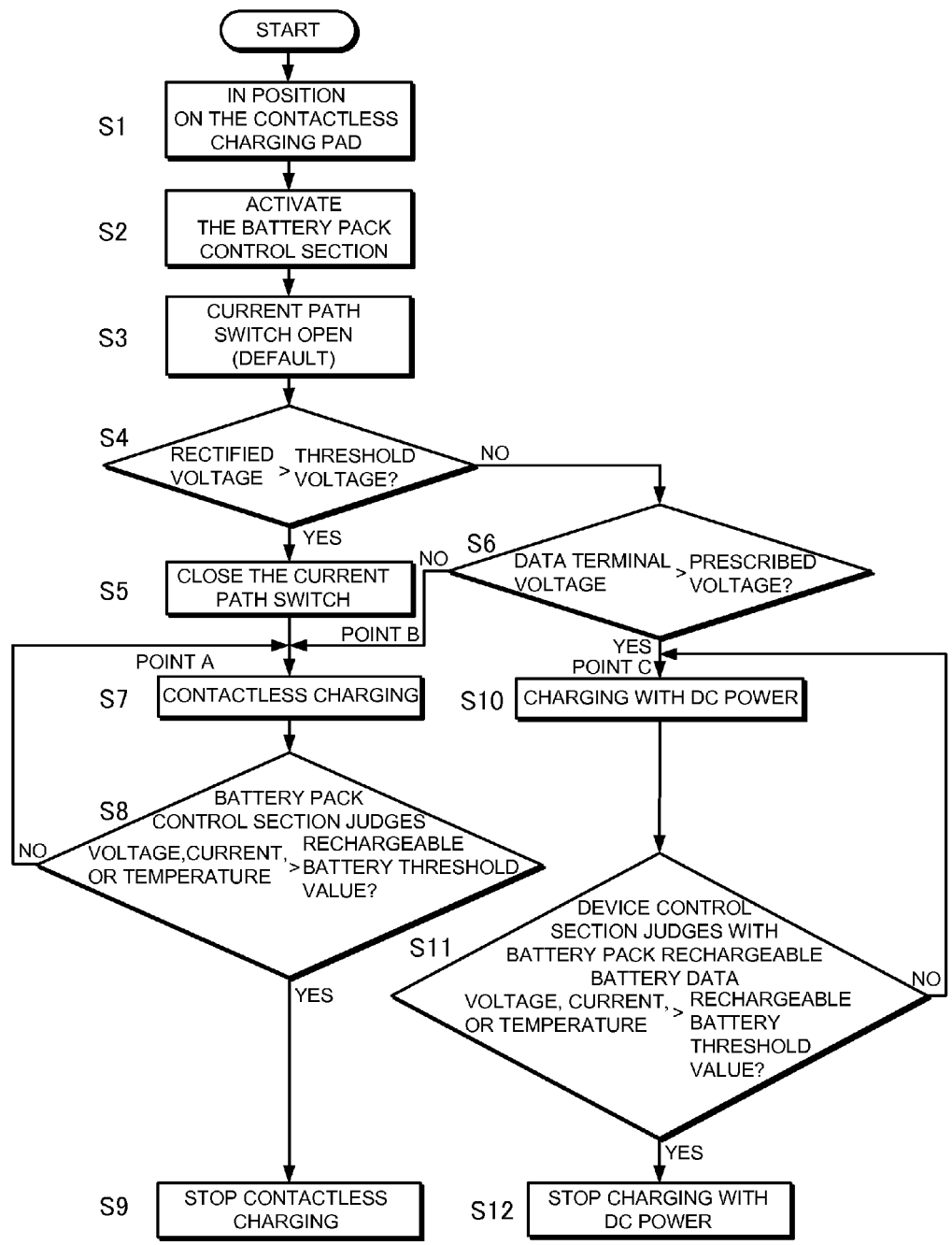
FIG. 8 is a flow-chart showing battery pack operations for the second embodiment of the present invention.

Turning to FIG. 8, battery pack operations are shown by a flow-chart for contactless charging according to the second embodiment of the present invention when the battery pack 90 is set on the charging pad 110 and receiving power.

[Step S1]

In step S1, the battery pack 90 is in position on the charging pad 110.

[Step S2]

When the charging pad 110 recognizes the battery pack 90, magnetic flux is generated by the charging pad 110, EMF induced in the receiving coil 1 is converted to DC power by the contactless charging circuit 95, and the battery pack control section 91 begins operation in step S2.

[Step S3]

In step S3, the battery pack control section 91 maintains the battery pack 90 current path switch 93 in the open state. (The default condition of the current path switch 93 is open.)

[Step S4]

In step S4, the battery pack 90 judges whether it is alone as a bare unit or connected with the battery powered device 100. This judgment is made in the battery pack control section 91, which has a connection decision section, by comparing the Vdd to GND voltage (rectified contactless charging circuit 95 voltage) with a threshold voltage. This judgment determines if the rectified voltage is greater than the threshold voltage. Since the rectified voltage is greater than the threshold voltage when the battery pack 90 is alone and unconnected, control moves to step S5 along the YES path. Since the rectified voltage becomes less than the threshold voltage when the battery pack 90 is connected to the battery powered device 100, control moves to step S6 along the NO path.

In step S5, since the bare battery pack 90 is placed on the charging pad 110 without connection to a battery powered device 100, the current path switch 93 is closed.

[Step S6]

In step S6, the battery pack 90 connected to the battery powered device 100 is placed on the charging pad 110, and step S6 judges whether or not DC power is supplied to the body of the battery powered device 101 from a commercial power source connected through an AC/DC adapter 143. The adapter charging circuit 153 in the body of the battery powered device 101 transmits detection of DC power to the battery pack 90 data terminal 103 through the system power supply section 154. When the voltage applied to the upper end of the temperature detection section 94 by the system power supply section 154 becomes greater than a prescribed voltage, the battery pack control section 91 detects that and judges connection of the AC/DC adapter 143. When the voltage is less than the prescribed voltage, the battery pack control section 91 determines that the AC/DC adapter 143 is not connected. When voltage greater than the prescribed voltage is detected at the data terminal 103, control moves to step S10 along the YES path, and when voltage greater than the prescribed voltage is not detected at the data terminal 103, control moves to step S7 along the NO path.

[Step S7]

In step S7, the charging switch 98 is closed to begin contactless charging. Here, the current path switch 93 is in the closed state when the battery pack 90 is alone and unconnected, and in the open state when the battery pack 90 is connected to the battery powered device 100.

[Step S8]

In step S8, battery pack 90 charging voltage, charging current, and battery temperature parameters monitored by the battery pack control section 91 are compared with respective rechargeable battery cell 2 threshold values. If any of the threshold values are exceeded, control moves to step S9 along the YES path. If none of the threshold values are exceeded, control returns to step S7 along the NO path to continue contactless charging.

[Step S9]

In step S9, contactless charging is stopped to end rechargeable battery cell 2 charging.

[Step S10]

In step S10, DC power is supplied to the body of the battery powered device 101 from the AC/DC adapter 143 connected to a commercial power source, and DC power is supplied to the rechargeable battery cell 2 in the battery pack 90 to begin charging.

[Step S11]

In step S11, DC power is supplied to the body of the battery powered device 101 from the AC/DC adapter 143 connected to a commercial power source. Data from the adapter charging circuit 153, remaining capacity computation section 155, and the temperature detection section 94 in the battery pack 90 are transmitted to the device control section 150. Based on the transmitted data, rechargeable battery cell 2 charging voltage, charging current, and battery temperature are compared with respective rechargeable battery cell 2 threshold values. If any of the threshold values are exceeded, control moves to step S12 along the YES path. If none of the threshold values are exceeded, control returns to step S10 along the NO path to continue charging with DC power.

[Step S12]

In step S12, charging with DC power is stopped to end charging of the rechargeable battery cell 2 in the battery pack 90.

Figure 9:
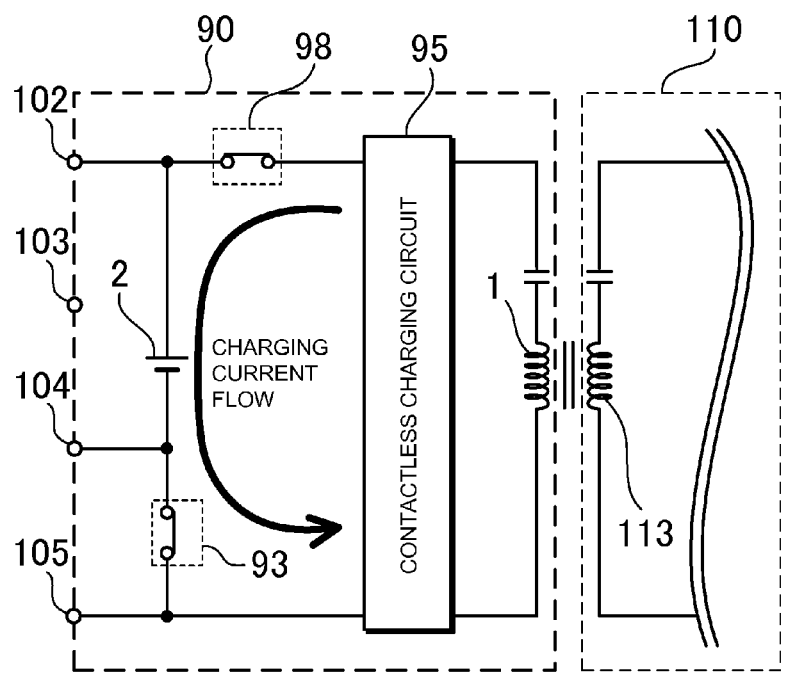
FIG. 9 is an abbreviated block diagram showing the charging current path through the rechargeable battery cell for conditions at point A in the flow-chart of FIG. 8.
Figure 10:
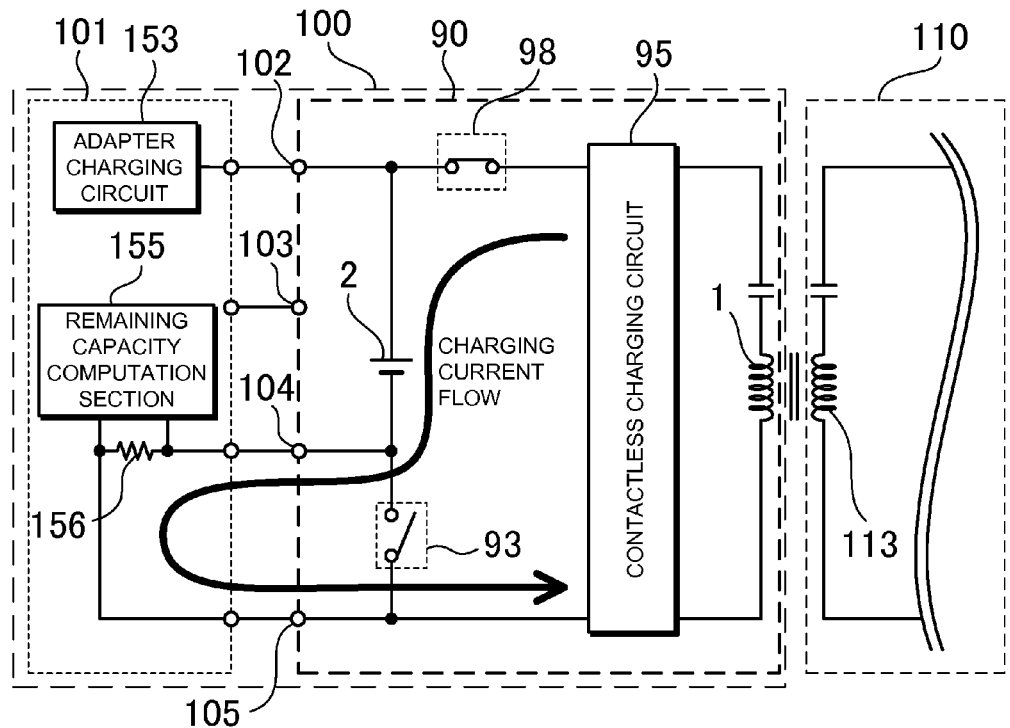
FIG. 10 is an abbreviated block diagram showing the charging current path through the rechargeable battery cell for conditions at point B in the flow-chart of FIG. 8.
Figure 11:
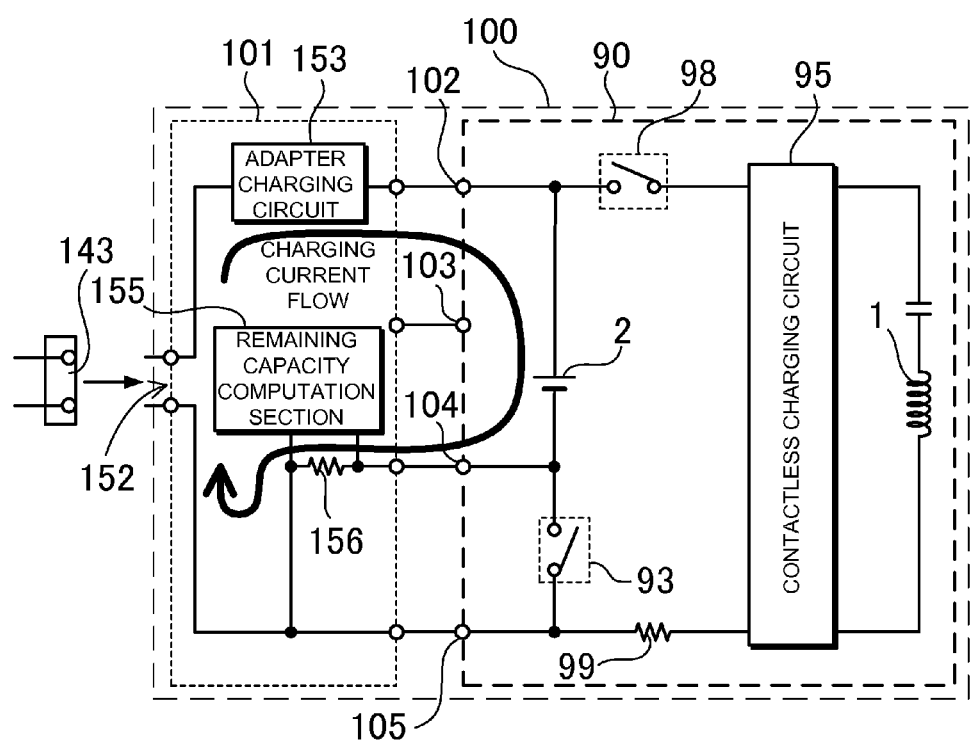
FIG. 11 is an abbreviated block diagram showing the charging current path through the rechargeable battery cell for conditions at point C in the flow-chart of FIG. 8.
Figure 12:
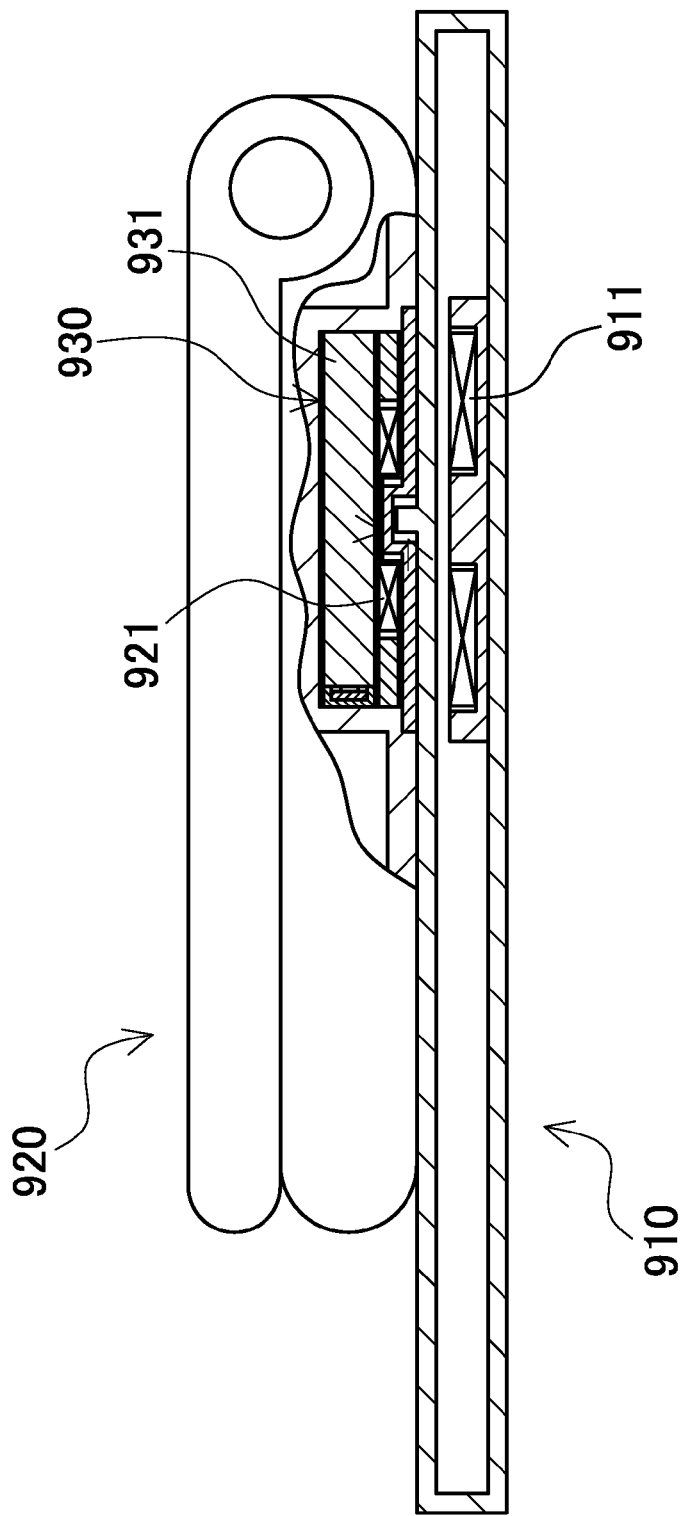
FIG. 12 is a vertical cross-section showing prior art contactless charging of a battery powered device placed on a charging pad.

FIGS. 9-11 show abbreviated block diagrams of the charging current path at point A in the flow-chart described above for contactless charging of the bare battery pack shown in FIG. 5, the charging current path at point B in the flow-chart for contactless charging of the battery pack in the battery powered device shown in FIG. 4, and the charging current path at point C in the flow-chart for adapter charging of the battery pack in the battery powered device shown in FIG. 6. FIG. 9, which corresponds to FIG. 5, is the abbreviated block diagram showing the charging current path at point A in the flow-chart. This circuit shows the battery pack 90 placed on the charging pad 110 as a bare unit. The flow of current in this charging circuit is from the contactless charging circuit 95 through the closed charging switch 98 to charge the rechargeable battery cell 2. Current returns to the contactless charging circuit 95 through the closed current path switch 93.

FIG. 10, which corresponds to FIG. 4, is the abbreviated block diagram showing the charging current path at point B in the flow-chart. This circuit shows the battery powered device 100, which is the battery pack 90 connected with the body of the battery powered device 101, placed on the charging pad 110. The flow of current in this charging circuit is from the contactless charging circuit 95 through the closed charging switch 98 to charge the rechargeable battery cell 2, and then through the battery pack 90 negative terminal 104 to the body of the battery powered device 101. Current flows through the charging current detection resistor 156 inside the body of the battery powered device 101, and through the battery pack 90 FG terminal 105 returning to the contactless charging circuit 95. The current path switch 93 is in the open state for this charging current path.

FIG. 11, which corresponds to FIG. 6, is an abbreviated block diagram showing the charging current path at point C in the flow-chart. This circuit shows the battery powered device 100, which is the battery pack 90 connected with the body of the battery powered device 101, supplied with DC power from an AC/DC adapter 143 connected to a source of commercial power. In this circuit, current flows from the DC input connector 152 connected to the AC/DC adapter 143 to the adapter charging circuit 153, and through the positive terminal 102 of the battery pack 90 to charge the rechargeable battery cell 2. Current returns to the AC/DC adapter 143 through the negative terminal 104 of the battery pack 90, through the charging current detection resistor 156 inside the body of the battery powered device 101, back to the DC input connector 152 and the AC/DC adapter 143. Both the current path switch 93 and the charging switch 98 are in the open state for this charging current path. Since this circuit configuration gives charging via DC power from the AC/DC adapter 143 priority over contactless charging, stable charging can be performed. Further, remaining capacity can be computed by the remaining capacity computation section 155 from voltage detected across the charging current detection resistor 156 to consistently control rechargeable battery cell 2 charging conditions inside the battery pack 90.

INDUSTRIAL APPLICABILITY

The battery pack, battery powered device, and contactless charging method of the present invention can be appropriately applied for a battery pack in devices such as mobile phones, portable audio devices, personal digital assistant (PDA) devices, and other hand-held devices.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2011-166,096 filed in Japan on Jul. 28, 2011, the content of which is incorporated herein by reference.

What is claimed is:

1. A battery pack to be connected to the body of a battery powered device to supply power to drive the battery powered device which is capable of displaying remaining battery capacity, the battery pack comprising:
    a rechargeable battery cell;
    a receiving coil that can magnetically couple with a transmitting coil housed in a charging pad;
    a charging current path formed by a charging circuit that converts power received by the receiving coil from the transmitting coil to charge the rechargeable battery cell;
    a connection decision section to determine whether the battery pack is alone or connected with the body of the battery powered device;
    a current path switch connected with the charging circuit and controlled based on decisions by the connection decision section to close when the battery pack is alone and to open when the battery pack is connected with the body of the battery powered device;
    a contactless charging circuit that rectifies power induced in the receiving coil; and
    a battery pack control section that includes the connection decision section, wherein the battery pack control section is configured to judge whether or not the body of the battery powered device is connected based on a voltage rectified by the contactless charging circuit.

2. The battery pack as cited in claim 1 wherein the battery pack is capable of changing the charging current path to allow transmission of information related to the remaining charge capacity of the rechargeable battery cell to the body of the battery powered device.

3. The battery pack as cited in claim 1, wherein the battery pack control section controls the current path switch open and closed.

4. The battery pack as cited in claim 3 wherein the connection decision section compares the voltage rectified by the contactless charging circuit with a set threshold voltage, and
    wherein the battery pack is judged as connected with the body of the battery powered device when the rectified voltage is below the threshold voltage; and the battery pack is judged as unconnected when the rectified voltage is greater than the threshold voltage.

5. The battery pack as cited in claim 4 wherein the threshold voltage is set higher than the full-charge voltage of the rechargeable battery cell.

6. The battery pack as cited in claim 1 wherein the initial state of the current path switch is set to the open condition.

7. The battery pack as cited in claim 1 further comprising an adapter decision section to determine whether or not the battery pack is connected to the body of a battery powered device receiving power from an AC/DC adapter connected to an external source of commercial power.

8. The battery pack as cited in claim 7, further comprising:
    a data terminal that connects with DC supply voltage from the AC/DC adapter or with a voltage converted from that supply voltage, wherein the battery pack control section acting as the adapter decision section uses the data terminal to determine whether or not the AC/DC adapter is connected.

9. A battery powered device provided with a battery pack, and a body of the battery powered device that is driven by power supplied from the connected battery pack and is capable of displaying the remaining capacity of the battery pack; the battery pack comprising:
   a rechargeable battery cell;
   a receiving coil that can magnetically couple with a transmitting coil housed in a charging pad;
   a charging current path formed by a charging circuit that converts power received by the receiving coil from the transmitting coil to charge the rechargeable battery cell;
   a connection decision section to determine whether the battery pack is alone or connected with the body of the battery powered device;
   a current path switch connected with the charging circuit and controlled based on decisions by the connection decision section to close when the battery pack is alone and to open when the battery pack is connected with the body of the battery powered device;
   a contactless charging circuit that rectifies power induced in the receiving coil; and
   a battery pack control section that includes the connection decision section, wherein the battery pack control section is configured to judge whether or not the body of the battery powered device is connected based on a voltage rectified by the contactless charging circuit.

10. The battery powered device as cited in claim 9 wherein the battery powered device communicates data related to the remaining charge capacity of the rechargeable battery cell with the body of the battery powered device by changing the charging current path.

11. The battery powered device as cited in claim 9 wherein the body of the battery powered device comprises a remaining capacity computation section connected with the charging circuit that can compute rechargeable battery cell remaining capacity during rechargeable battery cell charging by integrating current or power due to current flowing through the charging current path established by the charging circuit.

12. The battery powered device as cited in claim 9 wherein the remaining capacity computation section comprises a charging current detection resistor to detect the current that charges the rechargeable battery cell.

13. The battery powered device as cited in claim 9 wherein current is detected by a charging current detection resistor inside the battery powered device when the current path switch is in the open state.

14. A battery pack contactless charging method that places the battery pack on a charging pad, magnetically couples a receiving coil housed in the battery pack with a transmitting coil in the charging pad, and transmits power from the charging pad to the battery pack to charge the rechargeable battery cell inside the battery pack; the method comprising:
   placing the battery pack on the charging pad;
   rectifying power induced in the receiving coil;
   activating a battery pack control section, and opening a current path switch;
   detecting a voltage rectified in the receiving coil and determining whether or not the battery pack is attached to the body of a battery powered device based on the detected voltage by using the battery pack control section; and
   opening the current path switch to change the charging current path with the battery pack control section when the battery pack is determined to be attached to the body of the battery powered device.

15. The battery pack contactless charging method as cited in claim 14 wherein the system is configured to communicate data related to rechargeable battery cell remaining capacity with the body of the battery powered device by changing the charging current path.

16. The battery pack contactless charging method as cited in claim 14 further comprises determining whether or not the battery pack is connected to the body of a battery powered device receiving power from an AC/DC adapter connected to an external commercial power source, to begin contactless charging when the AC/DC adapter is judged as not connected, and to suspend contactless charging when the AC/DC adapter is judged as connected.

17. The battery pack contactless charging method as cited in claim 14 wherein current is detected by a charging current detection resistor inside the battery powered device when the current path switch is in the open state.

* * * * *